United States Patent [19]

Haak

[11] 3,976,990

[45] Aug. 24, 1976

[54] APPARATUS AND METHOD FOR OFFSETTING SELECTED CHARACTERS OF A CHARACTER DISPLAY

[75] Inventor: Gary R. Haak, Chicago, Ill.

[73] Assignee: Teletype Corporation, Skokie, Ill.

[22] Filed: Dec. 20, 1974

[21] Appl. No.: 535,069

[52] U.S. Cl. .......................... 340/324 AD; 178/15; 178/30

[51] Int. Cl.$^{2}$ .......................................... G06F 3/14

[58] Field of Search ................ 340/324 AD; 178/15, 178/30

[56] References Cited

UNITED STATES PATENTS

| | | | |
|---|---|---|---|
| 3,568,178 | 3/1971 | Day | 340/324 AD |
| 3,742,288 | 6/1973 | Albrecht et al. | 340/324 AD |
| 3,868,672 | 2/1975 | Johnson | 178/15 |

*Primary Examiner*—Marshall M. Curtis

*Attorney, Agent, or Firm*—W. K. Serp; J. L. Landis

[57] ABSTRACT

An apparatus is disclosed for displaying subscript and superscript characters on the screen of a cathode ray tube. The encoded characters are selectively read from a memory which also provides two extended level outputs relating to the subscript and superscript features. In response to the readout of a superscript character from memory, a superscript signal, at the related extended memory output, is fed to an amplifier which, in turn, drives a superscript coil positioned about the neck of the cathode ray tube. This superscript coil generates a flux which reacts with the flux generated by the tube's vertical deflection coil during readout of the selected character thereby raising the position of that character on the screen. Correspondingly, a subscript signal at the related extended memory output results in the generation of a magnetic flux which reacts the vertical deflection coil field during readout of the selected character thereby lowering the position of that character on the screen.

4 Claims, 2 Drawing Figures

APPARATUS AND METHOD FOR OFFSETTING SELECTED CHARACTERS OF A CHARACTER DISPLAY

BACKGROUND OF THE INVENTION

Various arrangements have been used and described for providing a visual display of stored encoded characters. Generally, the encoded character information is stored in a memory or readout means from which each encoded character is selectively read. The encoded character information is used to control the video information which is modulated on the beam of a cathode ray tube which provides a visual presentation on the tube screen corresponding to the character read from the memory. The characters may be generated on the screen in various ways. One particular arrangement displays each character in the form of a dot matrix written by a plurality of vertically spaced horizontal scans of an electron beam. The video information is pulsed, as determined by the memory readout, during each scan to produce the desired character dot pattern.

To increase the intelligibility of the displayed text, which is composed of successive rows of adscript characters, it is frequently desirable to provide certain characters with unique characteristics available in written or printed format. For example, the operator may find it useful to raise selected characters above their related character row, that is, provide superscript characters; or lower selected characters below their related character row to provide a subscript character. Such editorial freedom is particularly desirable in connection with the display of chemical compounds and other technical data where the use of subscript and superscript characters are, in fact, often times necessary to accurately display the information. Previously, such editorial freedom has not generally been available in connection with the operation of an electronic visual display apparatus.

SUMMARY OF THE INVENTION

The described apparatus includes a screen for displaying a plurality of characters at a plurality of possible predetermined locations. A readout means provides an encoded character signal which serves to determine a character to be displayed at one of the predetermined locations on the screen. Means are included for providing an offset signal in response to the presence of a selected encoded character from said readout means. Additionally, means are included responsive to the offset signal for shifting the location of the display of the selected character from the predetermined location to which the selected character relates thereby rendering visually distinct said selected displayed character.

The characters are displayed in rows of adscript characters upon the screen and the character shifting means serves to shift the location of the display of selected characters from their predetermined location so as to render visually distinct the selected character with respect to at least some of the normally displayed characters in the related row.

The characters are positioned upon the screen by means of a magnetically deflected electron beam and during the writing of the selected character, the magnetic beam deflection field is altered, offsetting the selected character from its normal location in its related row. It is a main object of this invention to provide an apparatus which will display a plurality of characters at selected locations, and will additionally permit the operator to offset selected characters from their normal location.

Other objects and advantages of the invention will be more readily appreciated after reference to the following description and accompanying drawing wherein:

DESCRIPTION OF THE ILLUSTRATED EMBODIMENT

General

Figure 1:
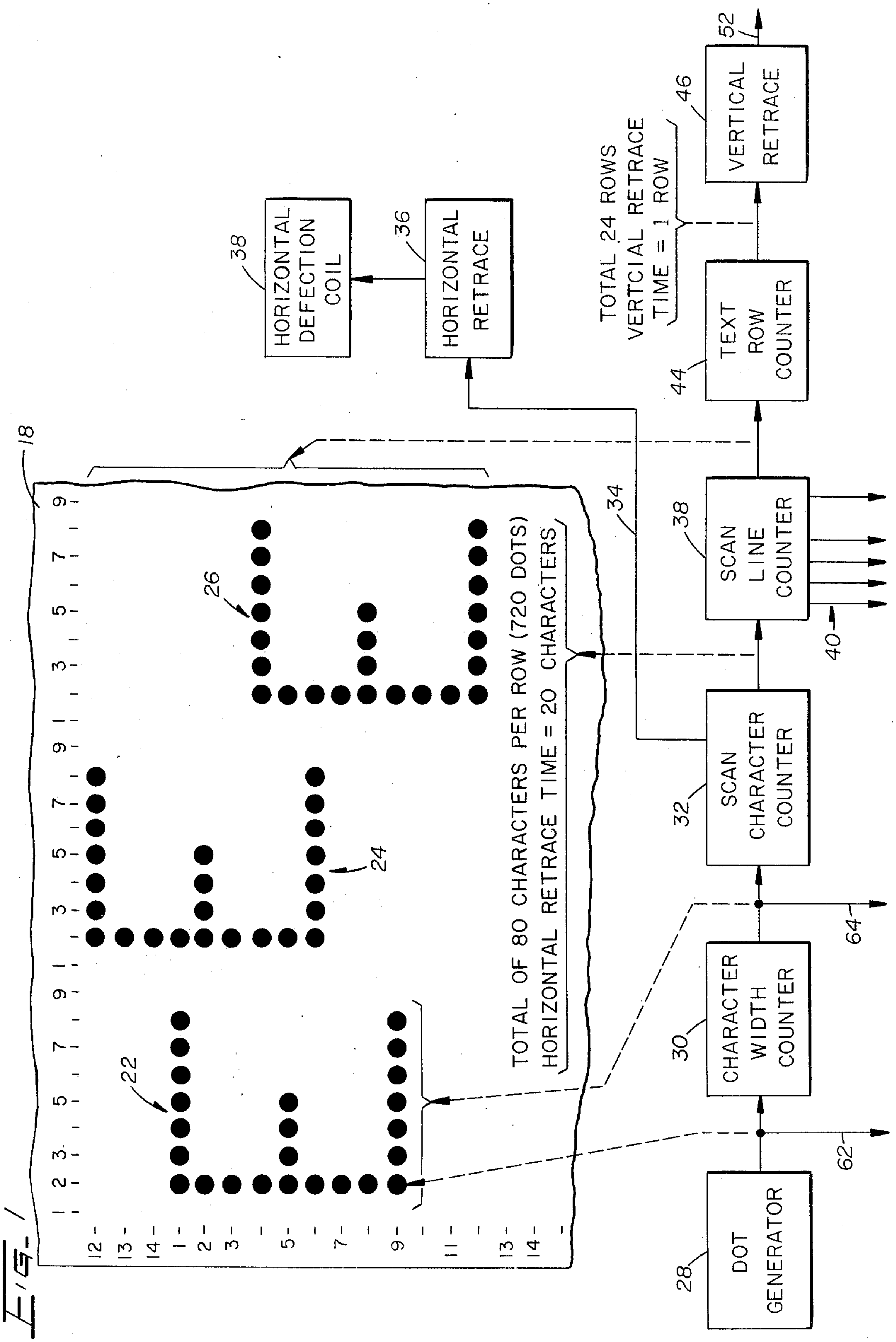
FIG. 1 is a fragmentary view of the screen of a cathode ray tube display and a partial diagram of a display apparatus.
Figure 2:
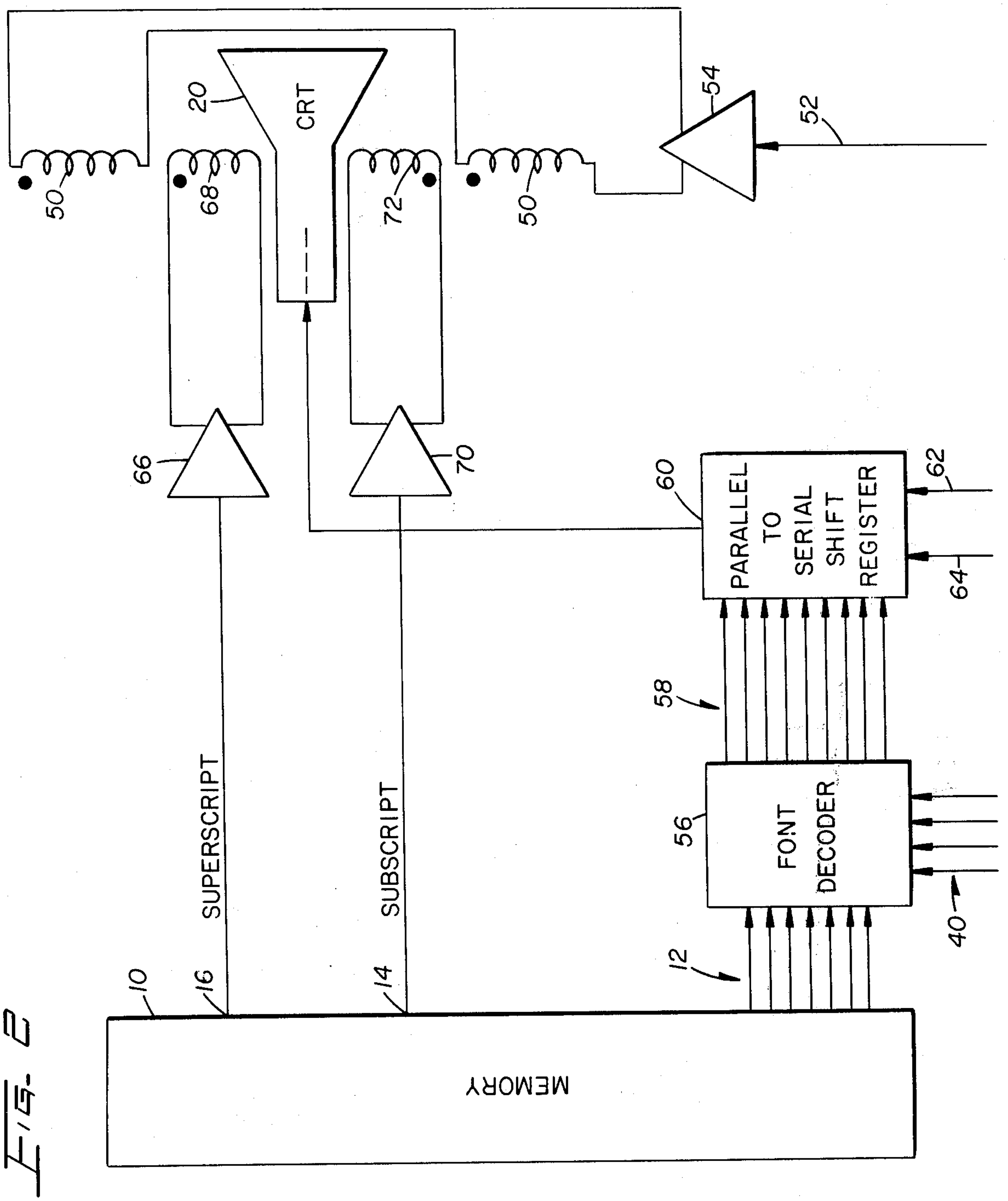
FIG. 2 is a partial diagram which, when combined with the diagram of FIG. 1, illustrates a display apparatus including certain features of this invention.

With reference to FIG. 2, the characters to be displayed are stored, in encoded form, in a readout means or memory 10. The memory 10, upon selected command, provides multilevel signal information representing each character in the form of a parallel seven level ASCII code via lines 12, as well as two extension levels at outputs 14 and 16. In response to a signal at one of the two extension outputs 14 and 16, the related character is shifted from its location on the character row to an offset position to provide the subscript and superscript features, respectively, illustrated on a screen 18 (FIG. 1) of a cathode ray tube 20 as will be hereinafter further described.

As illustrated, each of the individual characters comprising a character text row are created by selectively unblanking the beam of a cathode ray tube 20 to illuminate selected dots in a matrix which is approximately nine dots in width and 14 dots in height. Each row of characters is generated by 14 distinct scans. During the generation of a character row, each encoded character is read from memory 14 times, that is, once for each scan line in the row. In practice, the dots forming a character are enlarged slightly, causing them to merge thereby forming a continuous character as described in U.S. Pat. No. 3,609,749, issued to W. B. McClelland on Sept. 28, 1971 and incorporated herein by reference. A single displayed character is seven dots in width providing a two dot spacing between individual characters and is nine dots in height providing a five dot spacing between character rows. The normal row location of a character "E" includes scan lines one through nine as illustrated at 27 of FIG. 1. The five scan line inter-row space is utilized for the location of superscript and subscript characters as at 24 and 26, respectively. However, it should be noted that even when a superscript or subscript character is generated, at least a two dot inter-row space remains between successive character rows.

In response to a superscript signal at superscript output 16 of the memory, the dots forming the selected character, are shifted upwardly during the scan of that character thereby offsetting the display of the selected character above the corresponding character row in which the selected character would normally be displayed as at 24. Similarly, in response to a signal at the subscript output 14, the character read from the memory 10 is displayed below its row of related row characters thereby providing a subscript character as at 26. Thus, the presence of a signal at either of the ports 14 or 16 will cause the associated character to be displayed either above or below its normal character row, thus providing superscript and subscript features on the screen 18.

Timing

Throughout the following discussion, certain timing relationships are described. It should be understood that these timing relationships are provided to give the reader a better understanding of the operation of the embodiment herein described and not in limitation of the invention. In FIG. 1, the letter "E" at 22 is formed by a matrix of dots seven columns wide and nine lines high. As previously mentioned, the area of the screen 18 assigned to each character is nine dots wide and 14 dots in height, thus providing a two dot space between adjacent characters in a row and a five dot space between successive character rows. Serving to determine the spacing of the dots and establish a time base for the apparatus is an oscillator or dot generator 28 which drives a character width counter 30 of modulus nine which is the dot width of that portion of the screen 18 assigned to a character. Upon completion of one horizontal scan of a character, the character width counter 30 provides an output pulse the frequency rate of which is equivalent to the time necessary to write the width of one character plus two interspacing dots, which is the total width of the screen area assigned to a character. Providing an output pulse at the start of each horizontal scan, is a scan character counter 32 of a modulus 100. An entire character line is scanned by the cathode ray tube 20 beam and retraced during a time duration equivalent to the generation of 100 characters. The full width of the screen 18 of a cathode ray tube 20 accommodates eighty characters, thus providing a horizontal retrace time equivalent to twenty characters. Serving to trigger a horizontal retrace, a decoded count output from the scan character counter 32 is fed via line 34 to a horizontal retrace unit 36 which, in turn, drives a horizontal deflection coil 38 positioned about the neck of the cathode ray tube 10 in a conventional manner. The output of the scan character counter 32 drives a scan line counter 38 of a modulus 14, which corresponds to the fourteen scan lines comprising a character row.

As previously mentioned, the matrix area assigned to each character is approximately nine dots in width and 14 dots in height. Thus, for every 14 scans of the beam, one horizontal row of characters is written. The scan line counter 38 generates one output pulse for each 14 scan lines equivalent to the writing of one character row. Each of the counter levels of the scan line counter 38 are brought out via conductors 40 for decoding purposes to be described in connection with the discussion of FIG. 2. The output of the scan line counter 38 is fed to a text row counter 44 of modulus 25. The output of the text row counter 44 drives a vertical retrace unit 46 which, in turn, drives a vertical retrace coil 50 positioned about the neck of the cathode ray tube 20 via line 52 through an amplifier 54. The vertical display area of the cathode ray tube 20 screen 18 is of sufficient height to accommodate 24 rows of characters with a vertical beam retrace requiring a time equivalent to the writing of one character row thereby utilizing all 25 counts of the text row counter 44.

Character Generation

With respect to FIG. 2, the encoded character information stored in the memory 10 is selectively read out by means of a memory address (not shown) which does not form part of this invention. A particular memory address arrangement suitable for use in the illustrated embodiment is described in U.S. Pat. No. 3,827,041 entitled "Display Apparatus with a Visual Segment Indicia", issued to Harold D. Cook on July 30, 1974, and having a common assignee with this application. As mentioned previously, the memory 10 includes seven character output ports or levels 12 which provide the ASCII levels of the encoded character stored at the selected memory location. The remaining two outputs 14 and 16 relate respectively to the subscript and superscript information. The seven level code via the lines 12 is fed to a font decoder 56 which serves to convert the encoded character into a video format suitable for controlling the beam of the cathode ray tube 18. Parallel output levels 58 of the font decoder are fed to the parallel inputs of a parallel-to-serial shift register 60. The memory 10 presents a multilevel encoded character signal to the input of the font decoder 56 and the address lines 40 from the scan line counter 30 present a binary level related to the scan line which is the desired decoding scan line for the character being read from the memory 10. For example, when the letter "E" is presented to the font decoder 56 from the memory 10 and when the address lines 40 select scan line 6, the output will be unblanked to provide dots at character columns two through five inclusive. It will be appreciated that during the writing of a complete character row, each encoded character in that row is read from the memory 10 fourteen times corresponding to the fourteen horizontal scans which comprise a complete character row.

The output of the shift register 60 is stepped at the frequency rate of the output signal of the dot generator signal via line 62 and the shift register 60 is selectively loaded with each encoded character from the font decoder in response to a load signal via line 64 from the output of the character width counter 30. Thus, the character to be displayed is read out from the memory 10 and the seven parallel ASCII levels are fed to the font decoder 56 where they are decoded on a scan line basis. The font decoded character signal output from the font decoder 56 passes through the parallel serial shift register 60 to the control grid of the cathode ray tube 20, thus controlling the intensity of the beam upon the CRT screen. This process is repeated for each character in a character row and after the 14 scan lines comprising a character row have been written, the memory is stepped to the next adjacent character row.

Script Enhancement

Receiving the output signal from the superscript output 16 of the memory 10 is an amplifier 66 which drives a superscript vertical deflection coil 68 mounted about the neck of the cathode ray tube 20. In response to the presence of a superscript enhancement signal from the memory output 16, a magnetic flux is developed by the superscript coil 68 which bucks the vertical deflection flux developed by the vertical deflection coil 50. Thus, during that portion of time during a horizontal scan of the cathode ray tube beam when a superscript character is read from the memory 10, the vertical beam deflection flux rises by the amount attributable to the magnetic flux generated by the superscript, vertical deflection coil 68 thereby raising the electron beam on the cathode ray tube 20 screen during the writing of that character as at 24.

Receiving the output signal from the subscript output 14 of the memory 10 is an amplifier 70 which, in turn, drives a subscript vertical deflection coil 72 mounted about the neck of the cathode ray tube 20. In response to the presence of a subscript enhancement signal at the output 14, a magnetic flux is developed by the subscript coil 72 which aids the magnetic flux generated by the main vertical deflection coil 50. Thus, during that portion of a horizontal scan when a subscript character is read from the memory 10, the total vertical deflection flux to which the cathode ray tube beam is subjected is reduced by the flux generated by the subscript vertical deflection coil 72, lowering the position of the electron beam on the screen 18 during the writing of a selected character from the memory thereby generating a subscript character as illustrated at 26 in FIG. 1. The relative directions of the magnetic fields generated by the coils 50, 68 and 72 positioned about the neck of the cathode ray tube 20 are indicated by dots located adjacent their respective coils.

Operation

In operation, the seven parallel levels representing an ASCII encoded character from the memory 10 are fed via lines 12 to the font decoder 56, decoded scan lines by scan line, and into the parallel-to-serial shift register 60. The font decoded character signals are serially applied to the control grid of the cathode ray tube 20. The beam intensity is selectively unblanked while scanning across the tube screen creating a character representative dot matrix for each character in a character row. As each of the character rows are scanned 14 times, the vertical retrace unit drives the vertical coils 50 through amplifier 54 thereby positioning the beam at a selected location upon the screen and sweeping the beam from the top to the bottom of the screen 18. As previously mentioned, the memory 10 also includes two enhancement script outputs 14 and 16 which supply either the subscript or superscript signals relating to a selected character read from the memory. In this respect, the presence of a superscript signal at output 16 in combination with a selected character produces an increase in the vertical deflection field applied to the beam of the cathode ray tube 20 causing the beam to raise slightly during the writing of the selected character. The increased flux during the writing of the selected character causes the matrix of that particular character to be raised above the general level of the remaining characters in the related character row. Similarly, a subscript signal at output 14 is fed to the amplifier 70 which, in turn, drives the vertical subscript coil 72. The flux generated by the vertical subscript coil 72 aids the flux generated by the main vertical coil 50 producing a downward deflection in the cathode ray tube beam during the generation of the dot matrix respecting that selected character. Thus, the selected character is written on a portion of the screen 18 which is slightly below the location of the remaining characters on the character row to which the subscript character relates. A display apparatus has been described which provides the operator with a latitude of editorial freedom by providing both superscript and subscript characters.

Although the invention has been particularly shown and described with reference to a preferred embodiment thereof, it will be understood that various changes in form and detail may be made without departing from the scope and spirit of the invention.

What is claimed is:

1. An apparatus for displaying a plurality of characters at a plurality of possible predetermined locations on a display screen comprising:

readout means providing an encoded character signal serving to determine a character to be displayed at one of said predetermined locations on the screen, means for providing an offset signal in response to the presence of a selected encoded character from said readout means;

means responsive to said offset signal for shifting the location of the display of said selected character from its predetermined row location on the display screen so as to render visually distinct said selected character with respect to at least some of the normally displayed characters in the related row;

said display screen forming a portion of a cathode ray tube and the electron beam being in the form of a cathode ray beam impinging the screen of the cathode ray tube, a main vertical deflection coil having a predetermined inductance, the magnetic field of which controls said cathode ray beam during the generation of a character row upon the cathode ray tube screen; and said character offset means including a minor vertical deflection coil having an inductance of a value less than said main vertical deflection coil inductance, said minor vertical deflection coil producing a second relatively constant magnetic field interacting with the magnetic field created by said main vertical deflection coil during the writing of said selected character so as to offset said selected character from its related row of corresponding characters.

2. The apparatus of claim 1 wherein said second magnetic field aids the magnetic field produced by said main vertical deflection coil thereby producing a superscript character.

3. The apparatus of claim 1 wherein said second magnetic field opposes the magnetic field produced by said main vertical deflection coil thereby producing a subscript character.

4. The apparatus of claim 2 which further includes a subscript vertical deflection coil having an inductance of a value less than said main vertical deflection coil and producing a third magnetic field which opposes the magnetic field generated by said main vertical deflection coil thereby producing a subscript character.

* * * * *